United States Patent Office 2,979,439
Patented Apr. 11, 1961

2,979,439

METHOD OF PRODUCING L-LYSINE BY FERMENTATION

Shukuo Kinoshita, Kiyoshi Nakayama, and Sohei Kitada, Tokyo, Japan, assignors to Kyowa Hakko Kogyo Kabushiki Kaisha, a corporation of Japan No Drawing. Filed Nov. 4, 1958, Ser. No. 771,732

5 Claims. (Cl. 195—47)

This invention relates to a novel method of producing L-lysine by fermentation. More specifically, it relates to a method of directly producing L-lysine in a substantial amount by culturing a selected microorganism in a culture medium, and of recovering the same.

L-lysine is well known as the most specifically indispensable amino acid for human and animal nutrition, and a wide use thereof is expected for enrichment of food.

Although L-lysine has been prepared by fermentation in the past as is disclosed in Can. J. Microbiol. 3, pp. 467 to 476, 1957, by E. L. Dulaney, the amount of L-lysine in the fermented medium was extremely small, i.e. of the order of 400 micrograms per milliliter. The separation and recovery of such a small amount of L-lysine from a large volume of medium of complex composition generally involves numerous difficulties. Therefore, from the industrial standpoint, to recover such a small amount of L-lysine from the fermented medium is of little practical value.

Also illustrative of prior processes for the preparation of L-lysine are the disclosures of the U.S. Patents 2,771,396, granted Nov. 20, 1956, and 2,841,532, granted July 1, 1958. In the former case the process comprises two steps, that is, (1) fermenting on a nutrient medium comprising glycerol and corn steep liquor with a mutant of *E. coli* in order to produce diaminopimelic acid, and (2) treating diaminopimelic acid thus obtained with the enzymes produced by an organism selected from the group consisting of *A. aerogenes* and *E. coli*. Therefore, in order to perform the above reaction, two separate microorganisms are necessary, and specific materials, such as glycerol and corn steep liquor, are required for the constituents of the culturing medium. In the latter case the process is accomplished by using one microorganism, but still comprises two steps, that is (1) fermenting a nutrient medium initially containing from about 0.1 to about 0.5 gram of L-lysine per liter with an L-lysine requiring mutant of *E. coli* under aerobic conditions to produce diaminopimelic acid, and (2) rupturing the cell wall of the microorganism and then continuing the reaction under anaerobic conditions to convert diaminopimelic acid into L-lysine.

On the contrary the present invention is a new process for directly producing L-lysine from carbohydrates and nitrogen sources in high yields by culturing a selected microorganism under aerobic conditions.

The object of this invention is to produce L-lysine at a lower cost than afforded by conventional methods.

The inventors have found that when a nutritionally deficient mutant of *Micrococcus glutamicus*, which requires for its growth amino acids selected from the group consisting of (a) homoserine, (b) threonine and methionine, (c) threonine and cystathione, and (d) threonine and homocysteine, is cultured in a suitable medium composed of saccharine materials, nitrogen sources and minerals, L-lysine is produced and accumulated in a large amount in said medium by the subtle biochemical mechanisms of the strain; and the L-lysine produced is easily recoverable from the medium. Such mutant strain may be produced by methods well known in the art, for example, by applying the method of Davis, described in Journal of American Chemical Society 70, 4267, 1948.

The two strains employed in this invention were obtained by the ultraviolet irradiation on the parent strain of *Micrococcus glutamicus* No. 534 (ATCC No. 13032). A living culture of each mutant, that is, *M. glutamicus* No. 702 (also called *M. glutamicus* No. 612–1) and *M. glutamicus* No. 901 (also called *M. glutamicus* No. 613–5), has been deposited with American Type Culture Collection in Washington, D.C. Said cultures have been given the designations ATCC No. 13286, and ATCC No. 13287, respectively.

*Micrococcus glutamicus* is a species which is not found in Bergey's Manual of Determinative Bacteriology (7th edition) since it is a new species discovered in 1955 by Shukuo Kinoshita, one of the present inventors, and his coworkers. The characteristics of *Micrococcus glutamicus*, represented by *M. glutamicus* No. 534, are described in copending application Serial No. 714,068, filed February 10, 1958, and are set forth below. A reference to this new species was published as "Taxonomical Study of Glutamic Acid Accumulating Bacteria, *Micrococcus glutamicus* nov. sp." (see Bulletin of the Agricultural Chemical Society of Japan, vol. 22, No. 3, pp. 176 to 185, 1958). As is pointed out in "Taxonomical Study of Glutamic Acid Accumulating Bacteria, *Micrococcus glutamicus* nov. sp.," the classification of *Micrococcus glutamicus* may be dependent upon the conditions under which the culture is grown, the criteria considered dominant in establishing the genus, and the classification scheme accepted by the taxonomist. Other investigators may classify the same organism as either a Micrococcus, a Corynebacterium or a Bacterium. In view of the new classification in Bergey's Manual of Determinative Bacteriology (7th edition), the organism may also be classified as Brevibacterium, instead of Bacterium.

*Micrococcus glutamicus* No. 534 is compared with other micrococci in Table I. The key of "Bergey's Manual of Determinative Bacteriology," 6th ed., is followed in this table.

As shown in Table I, the species of No. 18 to No. 22 are fundamentally different from *M. glutamicus* No. 534 in their anaerobic character. The species of No. 13 to No. 17 are definitely differentiated from *M. glutamicus* No. 534 in their red pigment production. The species of No. 1 to No. 5 are clearly different from *M. glutamicus* No. 534 in their inability to produce nitrites from nitrates. The species of No. 8 to No. 10 and No. 6 are different in gelatin liquefying character and acid production in milk from *M. glutamicus* No. 534. The species of No. 7, No. 11 and No. 12 are different in acid production in milk from *M. glutamicus* No. 534. The species of No. 8, No. 9a, No. 9b and No. 11 are also different in pigment production.

In addition, the species of No. 6 to No. 8 are differentiated in their ability to utilize ammonium salt as a sole source of nitrogen in Hucker's medium.

TABLE I

*Comparison of M. glutamicus No. 534 with other Micrococci*

| | A | B | C | D | E | F | G | H |
|---|---|---|---|---|---|---|---|---|
| 1. M. luteus | + | − | −* | | | | | |
| 2. M. urene | + | − | −* | | | | | |
| 3. M. freudenreichii | + | − | −* | | | | | |
| 8. M. caseolyticus** | + | − | −* | | | | | |
| 4. M. flavus | + | − | −* | | | | | |
| 5. M. candidus | + | − | −* | | | | | |
| 6. M. conglomeratus | + | − | + | +* | + | +* | +* | +* |
| 7. M. varians | + | − | + | +* | + | +* | +* | +* |
| 8. M. caseolyticus** | + | − | + | +* | −* | +* | +* | +* |
| 9a. M. pyogenes var. aureus | + | − | + | − | orange* | +* | +* | +* |
| 9b. M. pyogenes var. albus | + | − | + | − | −* | +* | +* | +* |
| 10. M. citreus | + | − | + | − | + | +* | +* | +* |
| 11. M. aurantiacus | + | − | + | − | orange* | ± | − | ± |
| 12. M. epidermidis | + | − | + | − | −* | +* | − | +* |
| 13. M. roseus | + | +* | | | | | | |
| 14. M. cinnabareus | + | +* | | | | | | |
| 15. M. rubens | + | +* | | | | | | |
| 16. M. rhodochrous | + | +* | | | | | | |
| 17. M. agilis | +* | +* | | | | | | |
| 18. M. aerogenes | −* | | | | | | | |
| 19. M. assaccharolyticus | −* | | | | | | | |
| 20. M. niger | −* | | | | | | | |
| 21. M. grigoroffi | −* | | | | | | | |
| 22. M. anaerobius | −* | | | | | | | |
| M. glutamicus No. 534 | + | − | + | − | + | − | − | − |

A—Relation of free oxygen (+, aerobic to facultatively anaerobic; −, anaerobic).
B—Reddish pigment production on agar.
C—Nitrate reduction to nitrite.
D—Ammonium salt utilization as a sole source of nitrogen.
E—Yellow pigment production on agar.
F—Acid production in milk.
G—Gelatin liquefaction.
H—Acid production from lactose.
*—Different from *M. glutamicus* No. 534.
**—Two strains of *M. caseolyticus* are found in Bergey's Manual of Determinative Bacteriology 6th edition. Each strain is compared in the Table I.

(In the absence of other definition the + and the − indicate the presence and absence, respectively, of the stated characteristics.)

The characteristics of *Micrococcus glutamicus*, represented by *Micrococcus glutamicus* No. 534 (ATCC No. 13032), will now be described in detail. The experimental tests were done according to the methods described in the descriptive chart of "Manual of Methods for Pure Culture Study of Bacteria" (published by the Society of American Bacteriologists, 1950).

Its morphological and physiological characters are as follows.

Slightly ellipsoidal spheres, usually in pairs, but also in single and irregular masses. Size of majority: 0.6–1.2 microns. Elongated forms are seen in some conditions. Not motile, spores are not formed. Gram-positive.

Agar slant: Moderate growth, filiform, dull, pale yellow.

Agar colonies: Circular, smooth, perfect, slightly elevated, pale yellow.

Broth: Slightly turbid, rings are seen sometimes along tube. Flocculent sediment, no odor.

Litmus milk: No change or slightly alkaline.

Gelatin stab: No liquefaction or very faint liquefaction.

Hydrogen sulfide not formed.
Indole not produced.
Starch not hydrolysed.
Nitrites produced from nitrates.
Catalase-positive.
Urease produced.
Phosphates-negative.
Voges-Proskauer reaction: Negative to very weak.
$NH_4H_2PO_4$ is not utilized as a sole source of nitrogen in Hucker's medium.
Citrate utilization in Koser's medium is negative.
Casein dissimilation: Negative or very weak.
Reduction of dyes: Methylene-blue, 2,6-dichlorophenolindophenol, Janus green and 2,3,5-triphenyltetrazolium chloride are reduced.

Methyl-red test: Weakly acidic.

Temperature relations: No growth at 47° C., very slight growth at 42° C., good growth at 28–37° C. Optimum temperature is about 30° C.

Optimum pH, between 7 and 8. Growth occurs between 6 and 9.

Acid from glucose, fructose, mannose, sucrose and maltose. No acid from lactose. (See Table II.)

L-glutamic acid is accumulated in a large quantity aerobically in the presence of carbohydrates, ammonium ion and inorganic salts.

Production of organic acid: α-ketoglutaric acid and lactic acid are produced in glucose media.

Aerobic.

Habitat: Air, soil and sewage.

TABLE II

*Acid production from carbohydrates by M. glutamicus No. 534*

| Carbohydrates | Agar medium | Liquid medium** |
|---|---|---|
| Inositol | − | ± |
| Arabinose | − | ± |
| Rhamnose | − | − |
| Xylose | − | ± |
| Melezitose | − | − |
| Starch | − | − |
| Inulin | − | − |
| Dextrin | − | − |
| Glucose | + | + |
| Fructose | + | + |
| Galactose | − | − |
| Mannose | + | + |
| Lactose | − | − |
| Sucrose | + | + |
| Maltose | + | + |
| Trehalose | −* | − |
| Melibiose | − | − |
| Cellobiose | − | − |
| Raffinose | − | − |
| Glycogen | − | − |
| Glycerol | − | − |
| Erythritol | − | − |
| Adonitol | − | − |
| Mannitol | −* | −* |
| Sorbitol | − | − |
| Dulcitol | − | − |
| Salicin | −* | − |
| Aesculin | − | − |
| α-Methylglucoside | − | − |

+—Acid is produced; −, Acid is not produced; ±, Acid production is doubtful.
*—Acid is produced by some other strains of M. glutamicus.
**—The composition of liquid medium is as follows: peptone 2%, carbohydrate to be tested 1%, distilled water the balance. To 1000 ml. of this solution, 1 ml. of 1.2% bromcresol purple alcohol (95%) solution was added before sterilization. Ph of the medium was adjusted to neutrality using NaOH solution.

On keying *M. glutamicus* according to Bergey's Manual of Determinative Bacteriology (6th edition), it is readily seen that such a microorganism is not there described. From said edition of Bergey's Manual it appears that *M. glutamicus* is most closely related *M. aurantiacus* and *M. epidermidis*, but differs from said known species as set forth in Table III.

TABLE III

*Comparison of M. glutamicus No. 534 with M. aurantiacus and M. epidermidis*

| Media | M. aurantiacus | M. epidermidis | M. glutamicus No. 534 |
|---|---|---|---|
| Milk | Weakly acidic | Produces acid | No change to slightly alkaline |
| Lactose | Produces acid | Produces acid | Does not produce acid |
| Nutrient broth | Turbid with pellicle | Turbid with white ring and sediment | Slightly turbid, rings are seen sometimes along tube. Flocculent sediment |
| Nutrient agar | Buff to scant orange-yellow beaded growth, raised, glistening | White | Moderate growth, milky white to pale yellow |

TABLE III—Continued

| Media | M. aurantiacus | M. epidermidis | M. glutamicus No. 534 |
|---|---|---|---|
| Habitat | Usually isolated from infections but also found in milk, cheese and dust. | Skin and mucous membranes. | Air, soil, sewage. |

It has been clearly established that *Micrococcus glutamicus* No. 534 is a strain of a new species belonging to the genus Micrococcus. This is shown below with reference to the "Key to the species of genus Micrococcus" as set forth in Bergey's Manual of Determinative Bacteriology.

I. "Key to the species of genus Micrococcus" from Bergey's Manual, 6th edition.
  (1) Aerobic to facultatively anaerobic species.
    *M. glutamicus* No. 534 is aerobic.
    B. Nitrites produced from nitrates.
      *M. glutamicus* No. 534 produces nitrites from nitrates.
    (2) Do not utilize $NH_4H_2PO_4$ as a sole source of nitrogen.
      *M. glutamicus* No. 534 conforms to this description.
      *aa.* Gelatin not liquefied or very slowly liquefied.
        *M. glutamicus* No. 534 conforms to this description.
        (In this section, 2 species namely *M. aurantiacus* and *M. epidermidis* are included.)

*M. glutamicus* is compared with and differentiated from *M. aurantiacus* and *M. epidermidis* in Table III. As shown in said table, *M. glutamicus* No. 534 is different from these two species in pigment on agar, acid production in milk and acid production from lactose.

In addition, in *M. epidermidis*, Voges-Proskauer reaction is positive although in *M. glutamicus* No. 534 this reaction is negative. This reaction is an important character according to C. Shaw, J. M. Stit and S. T. Cowan (J. Gen. Microbiol. 5, 1010, 1951).

II. "Key to the genera of *Family Micrococcaceae*" from Bergey's Manual, 7th edition, by Breed, Robert S.; Murray, E. G. D.; and Smith, Nathan R.; published by The Williams & Wilkins Company in Baltimore, Maryland; October 1957.
  (1) Aerobic to facultatively anaerobic species. Also includes some obligate anaerobes that occur in packets (Sarcina).
    *M. glutamicus* No. 534 is aerobic.
    A. Cells are generally found in irregular masses; occasionally they are single or in pairs.
      *M. glutamicus* No. 534 conforms to this description.
      1. Action on glucose, if any, is oxidative. Aerobic.
        *M. glutamicus* No. 534 is aerobic. Therefore, *M. glutamicus* No. 534 belong to genus I. *Micrococcus*.

According to the "Key to the species of genus Micrococcus," in Bergey's Manual, 7th ed.
  (1) May or may not reduce nitrates to nitrites. No free nitrogen or nitrous oxide gas produced from nitrates.
    *M. glutamicus* No. 534 conforms to this key.
    A. No pink or red pigment produced on agar media in young cultures.
      *M. glutamicus* No. 534 conforms to this key.
    (2) Nitrites produced from nitrates.
      *M. glutamicus* No. 534 produces nitrites from nitrates.

In this section, no species is described which does not utilize $NH_4H_2PO_4$ as a sole source of nitrogen. *M. glutamicus* No. 534 does not utilize $NH_4H_2PO_4$ as a sole source of nitrogen. So, it is clear that *M. glutamicus* No. 534 is different from any species listed in Bergey's Manual, 7th ed. That means *M. glutamicus* is a new species.

In the following table the parent strain (*M. glutamicus* No. 534) is compared with the L-lysine-producing mutants (*M. glutamicus* No. 702 and No. 901).

TABLE IV

| | M. glutamicus No. 534 (ATCC No. 13032) | M. glutamicus No. 702 (ATCC No. 13286) | M. glutamicus No. 901 (ATCC No. 13287) |
|---|---|---|---|
| amino acids requirement. | none | homoserine. or threonine and methionine. or threonine and cystathione. or threonine and homocysteine. | homoserine. or threonine and methionine. or threonine and cystathione. or threonine and homocysteine. |
| urease | positive | negative | positive. |
| color | normal | normal | albino. |

From the above table it is evident that *M. glutamicus* No. 702 and No. 901 are nutritionally deficient mutants of *M. glutamicus* No. 534. The fact that these nutritionally deficient mutants can produce L-lysine must be understood to be the most important basis of the present invention.

The phenomenon of L-lysine accumulation by these nutritionally deficient microorganisms is quite new and outstanding, and the theoretical explanation of the phenomenon is not known with certainly but it can be understandable by the present knowledge of biosynthetic pathway of amino acids as shown in Figure 1.

FIGURE 1

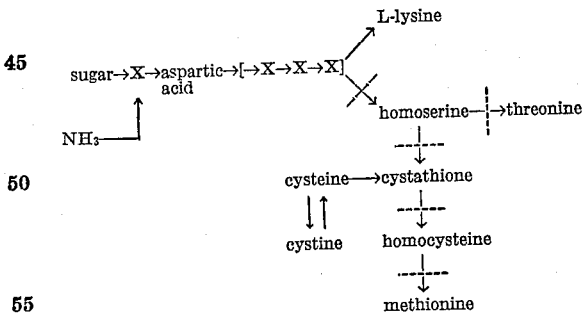

From above diagrammatic scheme of amino acids synthesis it is understandable that L-lysine can be accumulated as an overflow product when a microorganism is biochemically deficient in synthesizing ability of amino acids such as (*a*) homoserine, (*b*) threonine and methionine, (*c*) threonine and cystathione, and (*d*) threonine and homocysteine.

The method of acquiring these nutritionally deficient mutants has been well established, and anyone who is skilled in the art may easily obtain the required mutant microorganism from a given parent one by applying the conventional mutation techniques.

The inventors have also found that a methionine requiring mutnat strain of *E. coli* or of *M. glutamicus* No. 534 can also produce L-lysine in their culturing medium.

In order to carry out the L-lysine fermentation, any fermentable carbohydrate such as glucose, sucrose, fructose, mannose, maltose, xylose, galactose, high test molasses, black-strap molasses and acid hydrolyzed starch may be used. Several organic acids such as fumaric acid, lactic acid, succinic acid, and pyruvic acid may also be usable as the carbon sources. These fermentable carbohydrates can be used most commonly in the concentration between 2 to 15% by weight based on glucose equivalent.

As for the nitrogen sources, proteinous organic materials such as peptone, NZ-amine (trade name for an enzymatic digest of casein for microbiological use), casein hydrolyzates, soybean hydrolyzates, silk worm pupa hydrolyzates, meat extract, yeast extract, corn steep liquor, fish meal or the like, inorganic or organic ammonium salts such as $NH_4Cl$, $(NH_4)_2SO_4$, $(NH_4)_2CO_3$, $(NH_4)_3PO_4$, $CH_3CO_2NH_4$ or the like, urea and other nitrogen-containing materials can be used. It is preferable to use at least one proteinous nitrogen source above-mentioned together with synthetic nitrogen source such as urea or ammonium salts.

As for the minerals, $KH_2PO_4$, $MgSO_4$, $NaCl$, $K_2HPO_4$, $FeSO_4$, $MnSO_4$, and $CaCO_3$ may be added.

Fermentation is conducted under aerobic conditions such as on shaking flask culture or by submerged culture process using deep tank equipped with aeration and agitation devices. Fermentation temperatures are commonly used in the range between 24° C. to 37° C. The pH control during the fermentation is very important in this fermentation. When the fermentation has started, the pH of the medium tends to drop below 7.0, and when the pH goes down below 5.0, the fermentation practically stops. Therefore, the pH of the medium must be controlled within a range of from 5.1 to 8.5 with a suitable neutralizing agent such as ammonium hydroxide, caustic alkali (sodium hydroxide or potassium hydroxide), calcium carbonate or calcium hydroxide. The fermentation is continued commonly for two to five days, until a substantial amount of L-lysine is accumulated in the medium.

After completion of the fermentation, the fermented medium is filtered to remove the cells. The filtrate is passed through a column of weak cation exchange resin, such as the carboxylic resin Amberlite IRC–50 (trademark of Rohm & Haas Co., Philadelphia, Pa.), which is previously adjusted at pH 7.0 with phosphate buffer. After washing the resin column with water, it is eluted with 0.15 N aqueous ammonia to collect the fraction which shows positive ninhydrin reaction, and this fraction is evaporated to drive off the ammonia therein. Thereafter, to the fraction is added a calculated amount of hydrochloric acid, and said fraction is concentrated to dryness under reduced pressure. The dried residue is then dissolved in a small amount of water, to which alcohol is aded, and left to stand until L-lysine monohydrochloride crystallizes out. When ether is further added to the mother liquor, additional crystalline L-lysine dihydrochloride is obtained. Further purification is then carried out by a conventional method of crystallization.

Other conventional methods, such as ion exchange treatment, are also utilized for recovery of L-lysine. For example, the L-lysine in the filtrate is recovered by absorption of L-lysine on a strong cation exchange resin such as Amberlite IR–120, elution of the L-lysine from the cation exchange resin by diluted alkali, passage of this eluate through a weak cation exchange resin such as Amberlite IRC–50 which will not absorb the L-lysine, and drying of the effluent.

The following examples are given merely for the purpose of illustration and are not to be construed as limitations of this invention, many variations of which are possible without departing from the spirit or scope thereof.

EXAMPLE I

Two ml. of the cell suspension of *Micrococcus glutamicus* No. 534 (ATCC No. 13032) were placed in an ordinary laboratory petri dish and irradiated by 15 watt of ultraviolet lamp from the distance of 50 cm. for 4 minutes. By this treatment a white (abino) mutant and a urease negative mutant of the parent strain were separately obtained. Then separately treating the white (abino) mutant and the urease negative mutant again with the same ultraviolet irradiation conditions as above, a series of various mutants was obtained. The biochemical characteristics of these mutants were examined, and nutritionally deficient mutants which require for their growth an amino acid, such as a member selected from the group consisting of (a) homoserine, (b) threonine and methionine, (c) threonine and cystathione, and (d) threonine and homocysteine, were found. *M. glutamicus* No. 702 and *M. glutamicus* No. 901 were thus obtained.

EXAMPLE II

A fermentation medium was prepared as follows: 25 gr. of glucose, 5 gr. of $NH_4Cl$, 0.5 gr. of $KH_2PO_4$, 0.5 gr. of $MgSO_4 \cdot 7H_2O$ and 2 gr. of NZ-amine were dissolved in tap water and made up to 1 liter. The pH of the medium was about 7.0. Each 40 ml. of this medium was distributed in separate 250 ml. Erlenmeyer flasks and autoclaved at 110° C. for 10 minutes. After sterilization of the medium, 0.2 gr. of $CaCO_3$ which had been separately sterilized by dry heating was added to each 40 ml. of the medium. This medium was inoculated with *M. glutamicus* No. 702 (ATCC No. 13286), which was grown in glucose-bouillon medium on shaking culture device at 28° C. for 24 hours. During the fermentation, the pH of the medium was maintained within a range of from 5.1 to 8.5 by the addition of 10% by weight aqueous ammonia at each 4 to 6 hours interval. The analytical results during the fermentation is shown in Table V.

TABLE V

| Culturing duration (hours) | pH | L-lysine produced (mgr./ml.) | Yield based on added glucose (percent) |
|---|---|---|---|
| 62 | 5.81 | 3.6 | 14.4 |
| 86 | 5.99 | 6.7 | 26.8 |

The fermented medium which had been cultured for 86 hours was filtered to remove bacterial cells. 2.1 liters of this filtrate was passed through a column of weak cation exchange resin, Amberlite IRC–50, which was previously adjusted at a pH 7.0 with 0.5 M phosphate buffer. After washing the resin column with water, it was eluted with 0.15 N aqueous ammonia to collect the fraction which showed positive ninhydrin reaction, and this fraction was evaporated to drive off the ammonia therein. Thereafter the fraction was adjusted at pH of 2.0 with 6 N HCl and concentrated to dryness under vacuum. The product was dissolved in 15 ml. of water to which 100 ml. of absolute ethyl alcohol had been added and was left to stand until crude crystal of L-lysine monohydrochloride crystallized out. About 7.6 gr. of this material was thus obtained. When ether was further added to the mother liquor, 1.2 gr. of additional crude crystal of L-lysine dihydrochloride was obtained.

EXAMPLE III

The process described in Example II was repeated utilizing the same microorganism, and 25 gr. of maltose and 5.0 gr. of meat extract in place of glucose and NZ-amine. Comparable results were obtained; that is, L-lysine was produced in a concentration of approximately 6.2 milligrams per milliliter of the medium.

EXAMPLE IV

The process described in Example II was repeated utilizing the same microorganism, and 25 gr. of fructose and 20 gr. of casein hydrolyzate (equivalent to 2 gr. of casein) in place of glucose and NZ-amine. During the fermentation, the pH of the medium was maintained within a range of from 5.1 to 8.5 by addition of 10% by weight $(NH_4)_2CO_3$ aqueous solution at each 4 to 6 hours interval.

After 3 days culture, the culturing medium was found to contain L-lysine in a concentration of approximately 5.4 milligrams per milliliter.

EXAMPLE V

The process described in Example II was repeated utilizing the same microorganism and the following medium: 50 gr. of glucose, 10 gr. of $NH_4Cl$, 6 gr. of NZ-amine, 0.5 gr. of $KH_2PO_4$, 0.5 gr. of $K_2HPO_4$, 0.25 gr. of $MgSO_4 \cdot 7H_2O$, 0.01 gr. of $FeSO_4 \cdot 7H_2O$, 0.01 gr. of $MnSO_4 \cdot 4H_2O$, 1.0 gr. of yeast extract and 5.0 gr. of $CaCO_3$ were dissolved in tap water and made up to 1 liter.

After 3 days' culture, the culturing medium was found to contain L-lysine in a concentration of approximately 14 milligrams per milliliter.

EXAMPLE VI

The process described in Example II was repeated utilizing the same microorganism, and the following medium and conditions: 450 gr. of black strap molasses (equivalent to 225 gr. of glucose), 600 gr. of soybean hydrolyzate (equivalent to 60 gr. of dry soybean meal) and 45 gr. of $NH_4Cl$ were dissolved in tap water and made up to 3 liters. The pH of the medium was approximately 7.0. 3 liters of this medium were poured into a 5 liter jar fermenter and were sterilized, then the fermentation was carried out at 28° C. with stirring at the rate of 500 revolutions/minute and aeration at the rate of one volume of air/volume of the medium/minute.

After 60 hours' culture, the culturing medium was found to contain L-lysine in a concentration of approximately 20 milligrams per milliliter.

EXAMPLE VII

The process described in Example II was repeated utilizing the following medium and inoculum:

Medium: 25 gr. of glucose, 2 gr. of $NH_4Cl$, 0.5 gr. of $KH_2PO_4$, 0.5 gr. of $K_2HPO_4$, 0.5 gr. of $MgSO_4 \cdot 7H_2O$ and 2 gr. of peptone were dissolved in tap water and made up to 1 liter. The pH of the medium was approximately 7.0.

Inoculum: M. glutamicus No. 901 (ATCC No. 13287) which was grown in glucose-bouillon medium on shaking culture device at 37° C. for 24 hours.

The analytical results during the fermentation are shown in Table VI.

TABLE VI

| Culturing duration (hours) | pH | L-lysine produced (mgr./ml.) | Yield based on added glucose percent |
|---|---|---|---|
| 62 | 8.07 | 1.2 | 4.8 |
| 86 | 7.39 | 1.8 | 7.2 |

The fermented medium which had been cultured at 28° C. for 86 hours was filtered. From 1 liter of this filtrate 0.2 gr. of crude crystal of L-lysine monodrochloride and 0.55 gr. of crude crystal of L-lysine dihydrochloride were obtained.

It is thought that the invention and its advantages will be understood from the foregoing description and it is apparent that various changes may be made in the process without departing from the spirit and scope of the invention or sacrificing its material advantages, the process hereinbefore described being merely illustrative of preferred embodiments of the invention.

We claim:

1. A method of producing L-lysine by fermentation which comprises culturing in a culturing medium under aerobic conditions a nutritionally deficient mutant of *Micrococcus glutamicus*, which mutant requires for its growth a member selected from the group consisting of (a) homoserine, (b) threonine and methionine, (c) threonine and cystathione, and (d) threonine and homocysteine, maintaining the pH of the culturing medium within a range of from about 5.1 to 8.5 until a substantial amount of L-lysine is accumulated in said medium and recovering L-lysine from the medium.

2. A method according to claim 1, wherein the culturing medium contains as a nitrogen source at least one proteinous nitrogen source selected from the group consisting of peptone, an enzymatic digest of casein for microbiological use, casein hydrolyzate, soybean hydrolyzate, meat extract and yeast extract.

3. A method according to claim 1, wherein the culturing medium contains blackstrap molasses.

4. A method according to claim 1, wherein the nutritionally deficient microorganism is *Micrococcus glutamicus* ATCC No. 13286.

5. A method according to claim 1, wherein the nutritionaly deficient microorganism is *Micrococcus glutamicus* ATCC No. 13287.

References Cited in the file of this patent

UNITED STATES PATENTS

| 2,771,396 | Casida | Nov. 20, 1956 |
| 2,841,532 | Kita et al. | July 1, 1958 |

OTHER REFERENCES

Gale: Chem. and Indus., February 1948, pages 131–134.

UNITED STATES PATENT OFFICE
CERTIFICATE OF CORRECTION

Patent No. 2,979,439 April 11, 1961

Shukuo Kinoshita et al.

It is hereby certified that error appears in the above numbered patent requiring correction and that the said Letters Patent should read as corrected below.

Column 2, line 1, column 6, TABLE IV, column 3, line 7 and column 4, line 7 thereof, same column 6, line 50, same column 6, line 62, column 8, line 9, and column 10, line 20, for "cystathione", each occurrence, read -- cystathionine --; column 3, TABLE I, column 1, lines 23 and 24 thereof, for "assaccharolyticus", in italics, read -- asaccharolyticus --, in italics.

Signed and sealed this 9th day of October 1962.

(SEAL)
Attest:

ERNEST W. SWIDER
Attesting Officer

DAVID L. LADD
Commissioner of Patents